United States Patent
Xie

(10) Patent No.: US 7,310,973 B2
(45) Date of Patent: Dec. 25, 2007

(54) METHOD AND APPARATUS FOR MAKING VARIEGATED GLASS SHEETS AND TILES

(76) Inventor: Alex Xie, 385 Middlesex Ave., Colonia, NJ (US) 07067

( * ) Notice: Subject to any disclaimer, the term of this patent is extended or adjusted under 35 U.S.C. 154(b) by 441 days.

(21) Appl. No.: 10/952,079

(22) Filed: Sep. 28, 2004

(65) Prior Publication Data

US 2006/0070404 A1    Apr. 6, 2006

(51) Int. Cl.
| C03B 5/173 | (2006.01) |
| C03B 5/08 | (2006.01) |
| C03B 18/12 | (2006.01) |
| C03B 21/02 | (2006.01) |
| C03B 13/16 | (2006.01) |

(52) U.S. Cl. .................... 65/121; 65/99.2; 65/135.3; 65/29.11; 65/29.16; 65/145; 65/133

(58) Field of Classification Search ................ 65/121, 65/99.2, 134.3, 135.3, 29.1, 29.11, 29.16, 65/158, 146, 145, 182.3
See application file for complete search history.

(56) References Cited

U.S. PATENT DOCUMENTS

| 1,529,947 | A | * | 3/1925 | Freese | 65/121 |
| 1,828,217 | A | * | 10/1931 | Barker, Jr. | 65/121 |
| 1,828,226 | A | * | 10/1931 | Hiller | 65/121 |
| 2,115,408 | A | * | 4/1938 | Brosse | 65/146 |
| 2,955,384 | A | * | 10/1960 | Silverman | 65/146 |
| 3,343,935 | A | * | 9/1967 | Keefer et al. | 65/121 |
| 3,486,874 | A | * | 12/1969 | Rough | 65/146 |
| 4,004,902 | A | * | 1/1977 | Pieper | 65/134.2 |
| 4,133,666 | A | * | 1/1979 | Rhodes et al. | 65/101 |
| 4,612,030 | A | * | 9/1986 | Smids | 65/91 |
| 4,746,347 | A | * | 5/1988 | Sensi | 65/94 |
| 5,536,295 | A | * | 7/1996 | Slovich | 75/604 |
| 5,588,978 | A | * | 12/1996 | Argent et al. | 65/29.1 |
| 5,951,732 | A | * | 9/1999 | Duro | 65/61 |
| 6,236,334 | B1 | * | 5/2001 | Tapperson et al. | 340/825.37 |
| 7,058,542 | B2 | * | 6/2006 | Hauhia et al. | 702/183 |

FOREIGN PATENT DOCUMENTS

JP        59-64538        *    4/1984

* cited by examiner

*Primary Examiner*—Eric Hug
(74) *Attorney, Agent, or Firm*—Walter J. Tencza, Jr.

(57) ABSTRACT

An apparatus is disclosed comprising a first color glass feeder having a first valve device, and a second color glass feeder having a second valve device, each connected by communications links to a controller. The controller controls the first valve device and second valve device in order to provide molten glass of a first color and a second color, at a first and a second flow rate, respectively. The controller may be a computer. The controller may include an interactive device into which a first and a second flow rate value can be entered for controlling the first and second flow rates, respectively. The first and second color molten glasses may be incompletely mixed in a channel so that discrete portions of the molten glass of the first color and of the second color can be seen. The controller may also control a robotic mixing device.

13 Claims, 6 Drawing Sheets

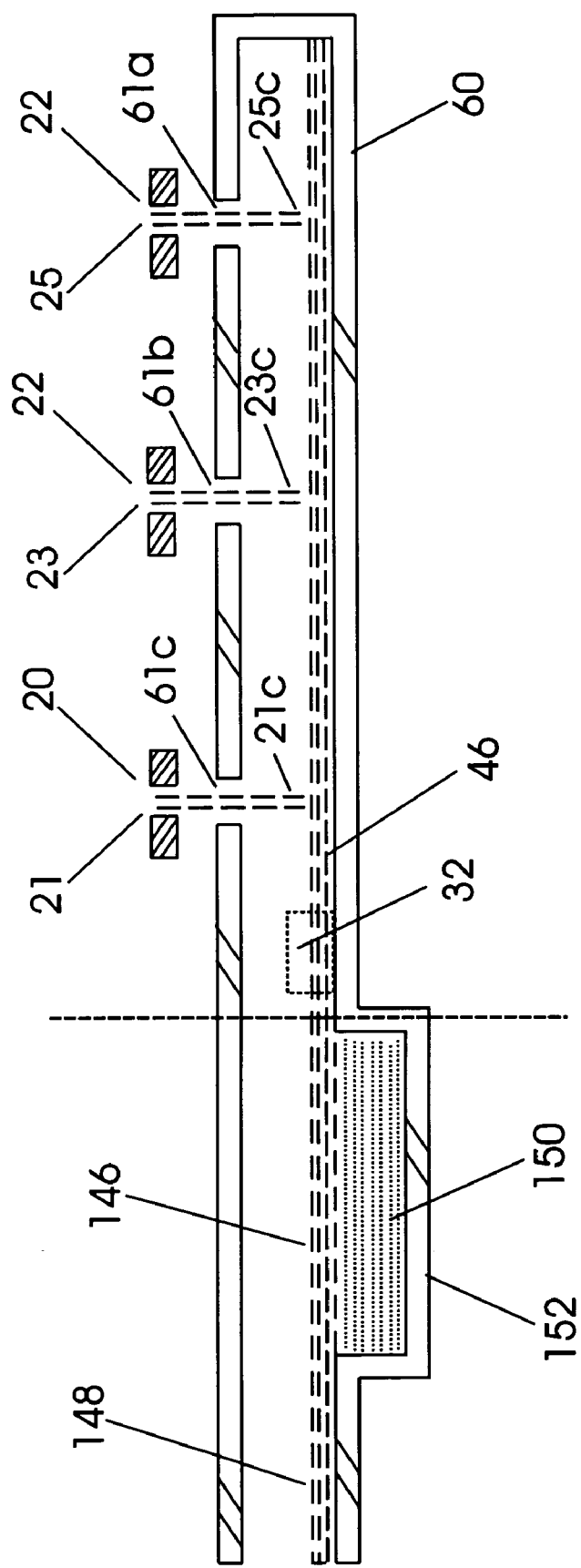

METHOD AND APPARATUS FOR MAKING VARIEGATED GLASS SHEETS AND TILES

FIELD OF THE INVENTION

This invention relates to improved methods and apparatus concerning making variegated glass.

BACKGROUND OF THE INVENTION

The term "variegated glass" refers to ornamental glass made by incompletely mixing two or more different colored glass components while they are in the molten state. Typically a primary molten glass may be heated in a furnace and then supplied to a mixing channel. One or more different colored glasses are also heated and supplied to the mixing channel to mix with the primary molten glass. Typically, the combined molten glass is mixed at the end of the mixing channel by a human operator by using a stirring rod. The mixture of molten glass is then fed into a pair of forming rollers to form a variegated glass sheet.

U.S. Pat. No. 4,133,666 to Rhodes, disclosing a method and apparatus for making variegated glass in a continuous sheet, is incorporated herein by reference.

Colored glass tiles made by one technique of the prior art, are made by painting or silk screening an artistic pattern with colored glass enamel (a first layer) on the back of clear glass (a second layer). The colored paint or colored silk screen pattern (the first layer) is then fused with heat on to the clear glass (the second layer). (See for example U.S. Pat. No. 6,607,809 to Baker-Salmon.) In this prior art technique there are only two distinct layers one on top of the other and the color (the first layer) is not distributed through the clear glass (the second layer) but rather lies only on top of or underneath the clear glass.

In another technique of the prior art, the first layer of colored glass enamel may be sandwiched between the second layer of clear glass and a third layer of clear glass. However, as in the first technique, the color (the first layer) is not distributed through the clear glass (second and third layers) but rather lies only on top of or underneath the clear glass.

SUMMARY OF THE INVENTION

The present invention in one or more embodiments provides an apparatus comprising a first color glass feeder having a first valve device connected by a communications link, which could be a wireless communications link, to a controller. The controller controls the first valve device in order to provide molten glass of a first color from the first color glass feeder to a mixing channel at a first flow rate. The controller may be a computer. The controller may include an interactive device into which a first flow rate value can be entered for controlling the first flow rate.

The apparatus may include a second color glass feeder having a second valve device. The second color glass feeder may be able to provide molten glass of a second color to the mixing channel to incompletely mix with the molten glass of the first color, by a stirring device, so that discrete portions of the molten glass of the first color and of the second color can be seen. The second valve device may be connected to the controller by a communications link, such as a hardwired or wireless communications link. The controller can control the second valve device in order to control a second flow rate of molten glass of the second color provided to the channel.

The apparatus may further be comprised of a robotic stirring device. The controller may be connected by a communications link to the robotic stirring device so that the controller can control the movement of the robotic stirring device. The robotic stirring device may be located so that the robotic stirring device can stir a confluent (mixture) of the molten glass of the first color and the molten glass of the second color in the mixing channel.

The present invention in one or more embodiments also provide a method of controlling a first valve device of a first color glass feeder with a controller to provide molten glass of a first color to a mixing channel at a first flow rate. The method may also include controlling a second valve device of a second color glass feeder with the controller to provide molten glass of a second color to the mixing channel at a second flow rate, and incompletely mixing, by use of a stiring device, the molten glass of the first color with the molten glass of the second color to form a mixture so that discrete portions of the first color and the second color are located in the mixture. The method may include controlling a robotic stirring device with the controller to control the movement of the robotic stirring device.

BRIEF DESCRIPTION OF THE DRAWINGS

FIG. 6 shows a cross sectional view of some of the components of the embodiment of FIG. 5 of the present invention.

DETAILED DESCRIPTION OF THE DRAWINGS

Figure 1:
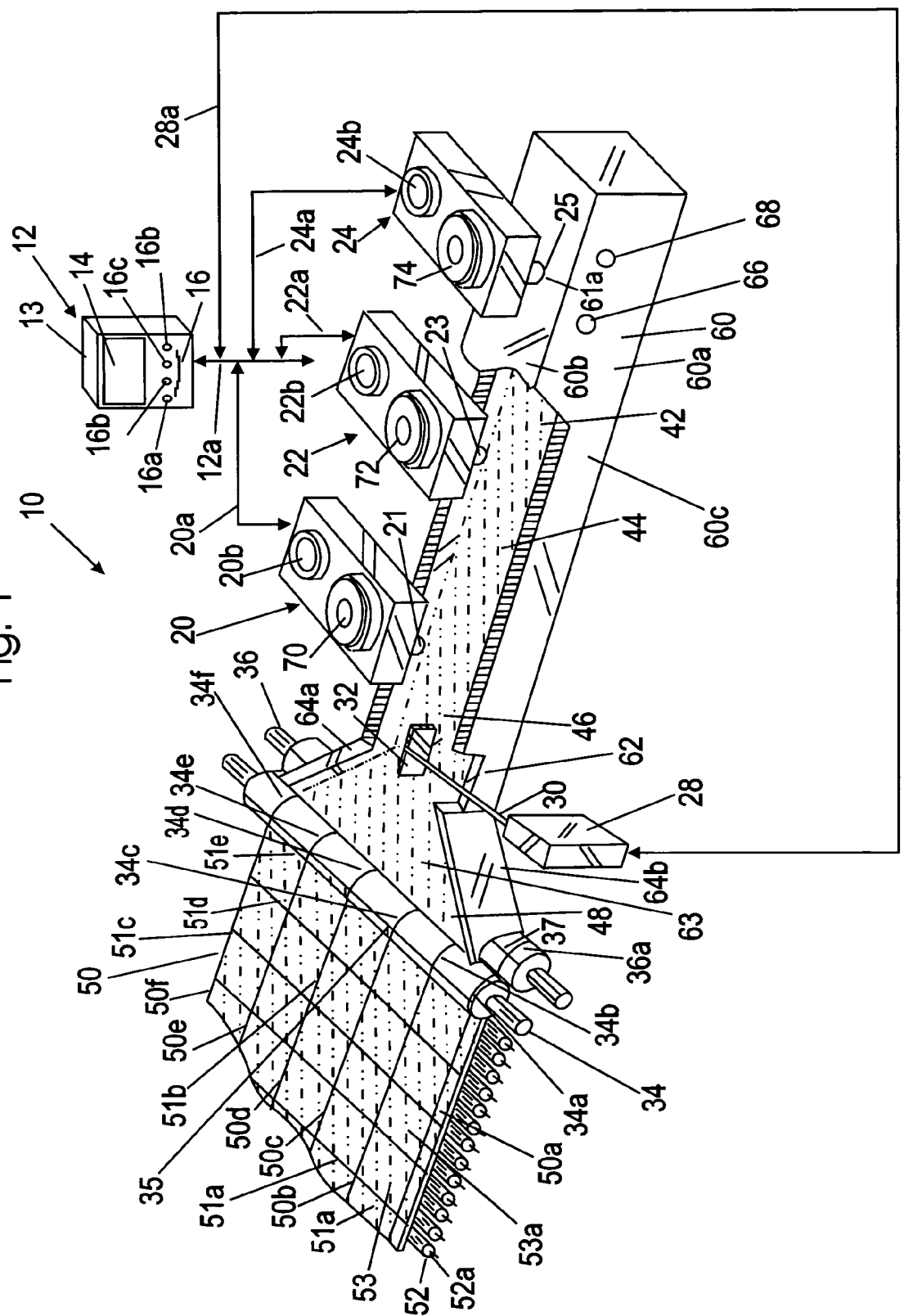
FIG. 1 shows a perspective view of an apparatus in accordance with an embodiment of the present invention.

FIG. 1 shows a perspective view of an apparatus 10 in accordance with an embodiment of the present invention. The apparatus 10 includes controller 12, color glass feeders 20, 22, and 24, and any further number of color glass feeders, mixing channel 60, robotic mixer 28, forming roller 34, forming roller 36, and a plurality of rollers 52. The robotic mixer 28 may be connected to a stirring rod 30 which may be connected to a paddle 32. Each of the color glass feeders 20, 22, and 24 may provide a molten glass of a particular color, where color includes clear or white, or any color. The molten glass may be provided at about 2500 degrees Fahrenheit (about 1370 degrees C.) from the color glass feeders 20, 22, and 24 into the mixing channel 60.

The controller 12 may be a computer. The controller 12 may include a housing 13 in which is located a processor 11. As shown by the block diagram of FIG. 4, the controller 12 may include the processor 11, a display device 14, an interactive device 16, and a memory 17. The processor 11 may be connected to the display device 14, interactive device 16 and memory 17 by communications links 11a, 16a, and 17a, respectively. Interactive device 16 which may be comprised of keys 16a, 16b, 16d, and 16e, or further keys or a touch screen panel, which can be pushed to enter data into the controller 12 and into the memory 17.

The controller 12 may be electrically connected to the color glass feeder 20 by communications links 12a and 20a. The controller 12 may be electrically connected to the color glass feeder 22 by communications links 12a and 22a, which may be wireless or wired communications links. The controller 12 may be electrically connected to the color glass feeder 24 by communications links 12a and 24a. The controller 12 may be electrically connected to the robotic mixer 28 by communications links 12a and 28a.

The color glass feeders 20, 22, and 24 may have funnels 20b, 22b, and 24b, and feeding holes 21, 23, and 25, respectively. A particular type of colored glass may be introduced into each of the funnels 20b, 22b, and 24b. For example, blue colored glass may be introduced into funnel 20b, green colored glass may be introduced into channel funnel 22b, and red colored glass may be introduced into channel funnel 24b. The different types of colored glass are typically introduced in molten form, such as at a temperature of about 2350-2500 degrees Fahrenheit, into funnels 20b, 22b, and 24b.

The color glass feeders 20, 22, and 24 include valve devices 70, 72, and 74, respectively. With the exception of the particular color of the glass provided to and by color glass feeders 20, 22, and 24, the color glass feeders 20, 22 and 24 may be the same, and therefore only color glass feeder 24 will be described in more detail.

Figure 2:
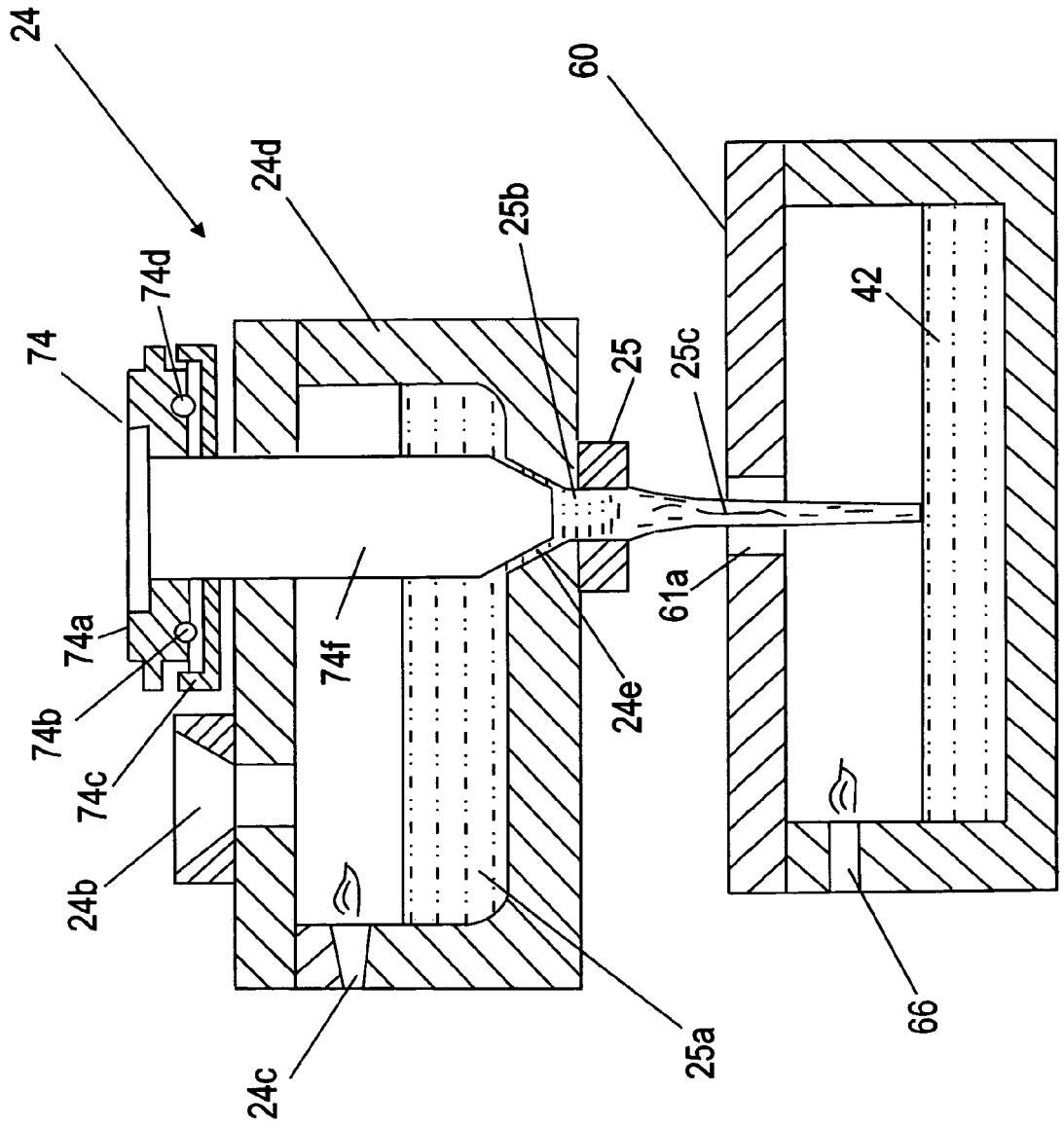
FIG. 2 shows a cross sectional view of part of the apparatus of FIG. 1.
Figure 3:
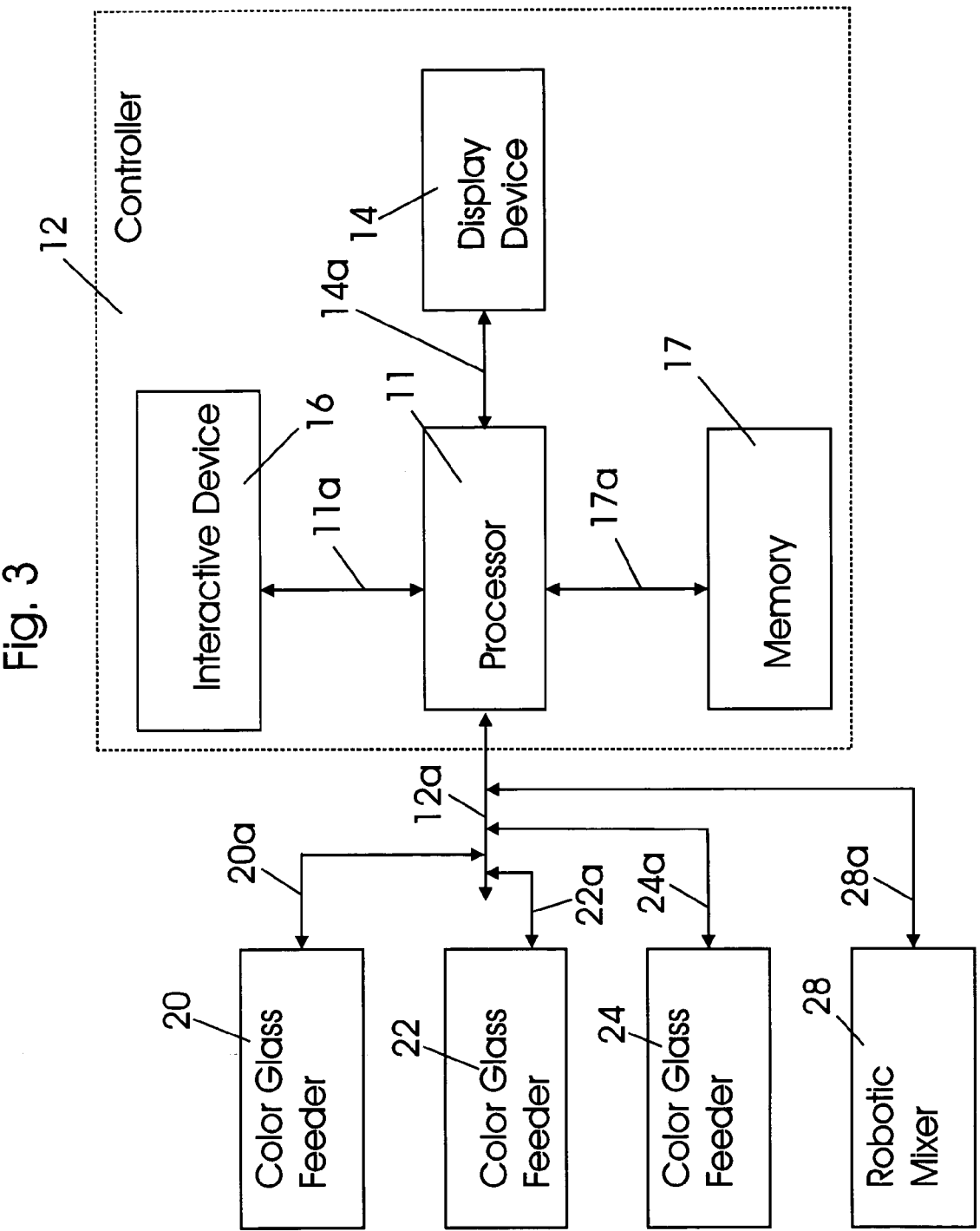
FIG. 3 shows a block diagram of various components of the apparatus of FIG. 1.

FIG. 2 shows a cross sectional view of the color glass feeder 24 and part of the channel 60 of the apparatus 10. The color glass feeder 24 includes the valve device 74. The valve device 74 includes driving mechanisms 74a, 74b, 74c, 74d, 74e, and 74f. The valve device 74 is connected to the communications link 24a, which could be a wired or wireless communications link, and thus to controller 12. The color glass feeder 24, which can be made from refractory material and steel structure includes a housing 24d having an opening or funnel 24b and heating elements 24c. The housing 24d also has an opening 24e at a bottom (or could be on the side) of the housing 24d. The opening 24e leads to the feeding hole 25.

The mixing channel 60 has a series of heating elements 66 and 68, which may be gas, oil or electric heating devices, for example. The mixing channel 60 may be made from a refractory material and a steel structure and may have a housing 60a, which surrounds molten glass or a molten glass mixture inside the mixing channel 60 and inside the housing 60a. The mixing channel 60 may become open at a top at the location where the robotic mixer 28 is located in FIG. 1. The mixing channel 60 is closed with the exception of openings for feeding color glass such as 61a in FIG. 2, and corresponding openings for glass feeders 22 and 20. The mixing channel 60 is shown open in FIG. 1 near glass feeders 22 and 20 for descriptive purposes, but would actually be substantially closed as the mixing channel 60 is near feeder 24, until the location 62 where the robotic mixer 28 is located. The channel 60 widens after the robotic mixer 28 at sections 64a and 64b to meet the width of the forming rollers 34 and 36.

In operation, a particular colored glass, such as red glass, is provided to the funnel 24b of the color glass feeder 24. The red molten glass is shown in the location 25a shown in FIG. 2. The valve device 74 is controlled by controller 12 to allow a certain amount of the red molten glass at location 25a to exit opening 24e and feeder hole 25. The exiting red molten glass is shown at location 25c. The exiting red molten glass enters an opening 61a in the housing 60a of the mixing channel 60 and is shown at location 42.

In a similar manner, a colored glass is provided by color glass feeder 22 through opening 23 and combines with the red molten glass from location 42 to form a combined molten glass at location 44, shown in FIG. 1. The molten glass from feeders 24 and 22, typically lay on top of one another until mixed by stirring device 28. The amount of glass provided by color glass feeder 22 is controlled by controller 12. In a similar manner, a colored glass is provided by color glass feeder 20 and combines with the combination of molten glass from location 44 to form combined molten glass at location 46, shown in FIG. 1. The molten glasses from feeders 24, 22, and 20 typically lay on top of one another until mixed by stirring device 28. The amount of glass provided by color glass feeder 20 is controlled by controller 12. The combined molten glass at location 46 is then stirred by robotic mixer 28 to incompletely mix the molten glass to form variegated glass at location 48. Variegated glass is a type of glass referred to, for example, in U.S. Pat. No. 4,133,666, to Rhodes, incorporated by reference herein. In variegated glass, the different glass components are not completely mixed, i.e. there will remain discrete identifiable portions of the different colors of glass. The stirring rate of robotic mixer 28 is controlled by controller 12.

Flow rates for glass to be provided by each of the color glass feeders 20, 22, and 24 may be entered using interactive device 16. The controller 12 may set the glass flow rates from feeders 20, 22, and 24 in accordance with the flow rate entered into interactive device 16.

Figure 4:
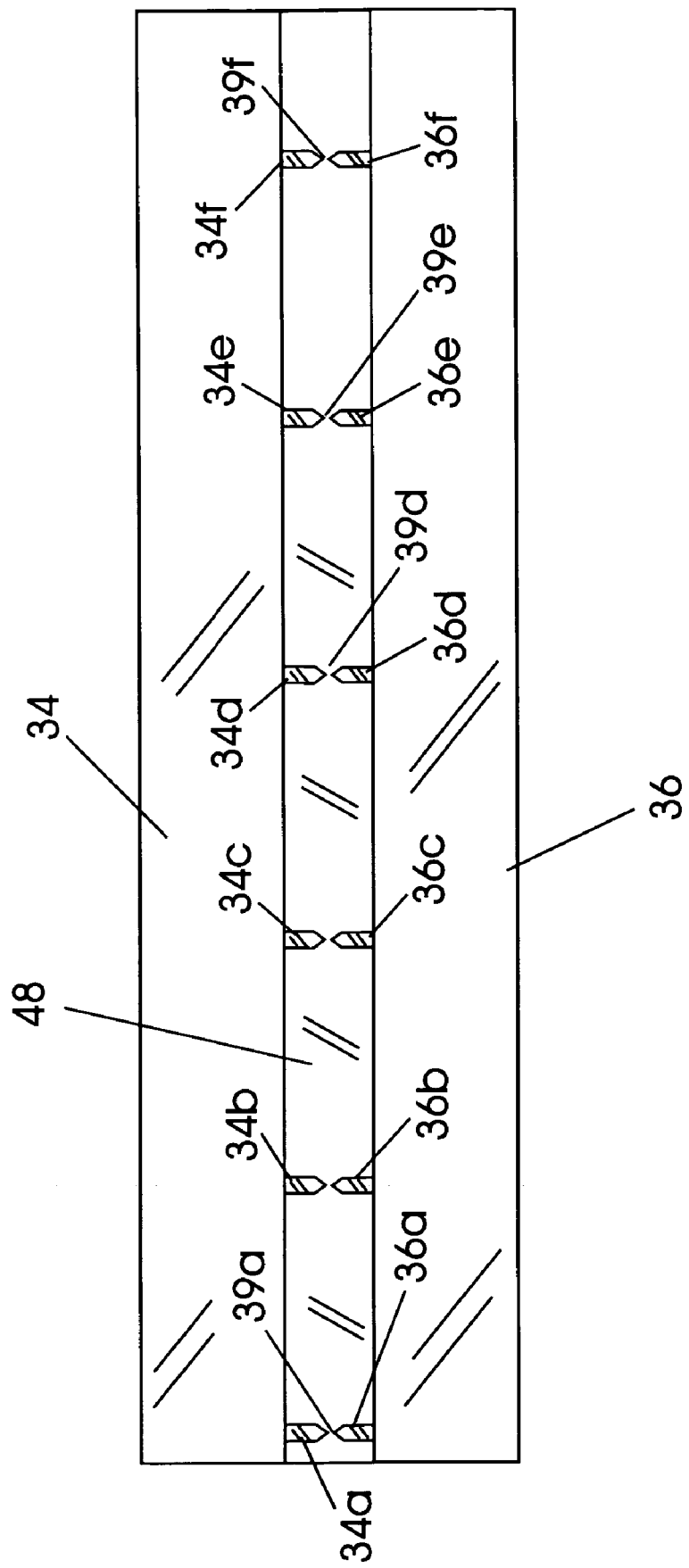
FIG. 4 shows a cross sectional view of part of forming rollers for use with the apparatus of FIG. 1.

After mixing, the molten glass mixture at location 48 is provided in the stirring bay or widening channel portion 63. The molten glass mixture 48 is then supplied between the forming rollers 34 and 36. The forming rollers 34 and 36 rotate in opposite directions. The forming roller 34 may have a surface with a sharp protruding edge 35, which traverses substantially the length of the roller 34. The surface of the roller 34 may have also have sharp protruding edges 34a, 34b, 34c, 34d, 34e, and 34f, shown in FIGS. 1 and 4, which are substantially perpendicular to the edge 35. Similarly, although covered partially by the depiction for molten glass at location 48, the forming roller 36 may be identical to forming roller 34 and may have a sharp protruding edge 37, similar to edge 35, and may have sharp protruding edges 36a-f, shown in FIG. 4, similar to sharp protruding edges 34a-f, respectively. As shown in FIG. 4, the edges 34a-f and 36a-f line up directly across from one another. The edges 35 and 37 would also line up directly across from one another.

After stirring, the incompletely mixed molten glass at location 48 is fed between the rollers 34 and 36, as shown by FIG. 4, and is pressed into squares or rectangular sections by the pressing action of edge 35 on roller 34 and corresponding edge 37 on roller 36 and edges 34a-f on roller 34 and corresponding edges 36a-f, respectively. Thus a sheet 50, shown in FIG. 1, is formed having a plurality of grid sections 53 such as grid section 53a. Each of the grid sections 53 is formed by cuts or scores in the sheet 50. For example grid section 53a if formed by pressing lines 50a, 50b, 51c, and 51b. The pressing lines 51a-e are formed by edge 35 on roller 34 and edge 37 on roller 36. The pressing lines 50a-50f are formed by edges 34a-f and corresponding edges 36a-f, respectively. The sheet 50 is thus formed, after passing through rollers 34 and 36, as a plurality of grid sections or tiles. There may be a thin layer of glass still connecting the grid sections, such as the sections 39a-f shown in FIG. 4, which can be snapped to separate the grid sections from each other. The sheet 50, or plurality of grid sections, may be transported by a plurality of rollers 52 into a traditional lire machine for annealing. The grid pattern formed by the edges on the surface of the forming rollers 34 and 36 could also be any geometric pattern or carved art pattern.

Each of the molten colored glass supplies provided to the color glass feeders 20, 22, and 24 at funnels 20*b*, 22*b*, and 24*b* can be hand ladled into the funnels 20*b*, 22*b*, and 24*b* or there may be a separate furnace supplying molten colored glass through one or more channels to each of color glass feeders 20, 22, and 24. Alternatively, each of color glass feeders 20, 22, and 24 may be considered as the molten glass exit part of a separate furnace. Each of the color glass feeders 20, 22, and 24 can be on a top 60*b*, as shown in FIG. 1 of the housing 60*a*, or on the side 60*c* of the housing 60*a* of the mix channel 60. The heating elements or devices 66 and 68 keep the molten glass in the mix channel 60 at a molten working state, for example at 2500 degrees.

The stirring rod 30 of the robotic mixing device 28 may move the paddle 32 in a three-dimensional cycle or track of movement. The rate of movement of the stirring rod 30 and the paddle 32 as well as the type of movement or track can be controlled by a controller 12 through communications links 28*a* and 12*a*.

By controlling the quantity of each molten color glass (such as by using valve driving mechanism 70, 72, 74 for feeders 20, 22, and 24, respectively), and by controlling the track and speed of the stirring rod 30 through controller 12 it is possible to repetitively produce substantially the same color mixture and swirl pattern of the variegated glass sheet 50 shown in FIG. 1. Thus substantially the same variegated glass can be mass-produced.

Figure 5:
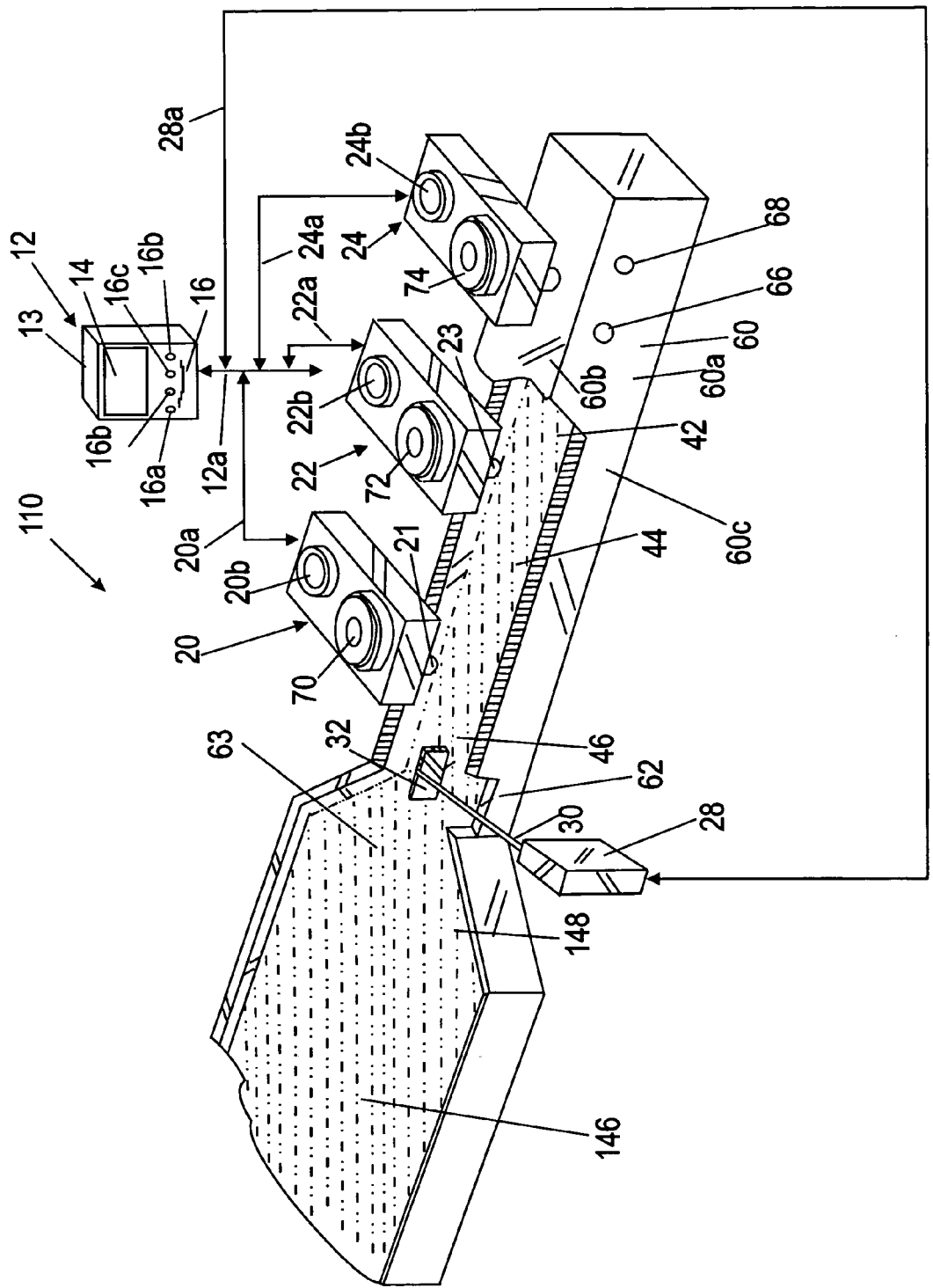
FIG. 5 shows a perspective view of an apparatus in accordance with another embodiment of the present invention.

FIG. 5 shows a perspective view of an apparatus 110 in accordance with another embodiment of the present invention. The apparatus 110 is similar to the apparatus 10 of FIG. 1, except that the apparatus 110 does not include forming rollers, like rollers 34 and 36 and has different components following widening region 63. In the embodiment of FIG. 5, variegated glass formed in widening area 63 is fed into and on top of a traditional molten tin bath 150 shown in FIG. 6, to make float variegated glass. A molten tin bath has not previously been used in the prior art to form float variegated glass. The variegated glass supplied by widening region 63 floats on top of the molten tin bath 150 as shown by FIG. 6.

FIG. 6 shows a cross sectional view of some of the components of the embodiment of FIG. 5 of the present invention. FIG. 6 shows openings 21, 23, and 25 of the glass feeders 20, 22, and 24 out of which streams 21*c*, 23*c*, and 25*c* of molten glass, respectively, are flowing. The streams 21*c*, 23*c*, and 25*c* are flowing into openings 61*c*, 61*b*, and 61*a* of the mixing channel 60. A confluent of molten glass, shown by dashed lines, is formed at location 46. The confluent of glass is incompletely mixed to form variegated glass by paddle 32, whose location is shown by dashed lines. The incompletely mixed glass from location 46 flows over an indented structure 152 having molten tin 150 near location 146 to form smooth glass at location 148.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a controller;
a first color glass feeder having a first valve device, the first color glass feeder able to provide molten glass of a first color to a channel;
wherein a communications link connects the first valve device to the controller; and
wherein the controller can control the first valve device in order to control a first flow rate of molten glass of the first color provided to the channel;
and further comprising
a second color glass feeder having a second valve device, the second color glass feeder able to provide molten glass of a second color to the channel to incompletely mix with the molten glass of the first color so that discrete portions of the molten glass of the first color and of the second color can be seen;
wherein a communications link connects the second valve device to the controller; and
wherein the controller can control the second valve device in order to control a second flow rate of molten glass of the second color provided to the channel.

2. The apparatus of claim 1 wherein
the communications link is a wireless communications link.

3. The apparatus of claim 1 wherein
the controller is a computer.

4. The apparatus of claim 1 wherein
the controller includes an interactive device into which a first flow rate value can be entered for controlling the first flow rate.

5. The apparatus of claim 1 further comprising
a robotic stirring device;
wherein the controller is connected by a communications link to the robotic stirring device so that the controller can control the movement of the robotic stirring device; and
wherein the robotic stirring device is located so that the robotic stirring device can stir a mixture of the molten glass of the first color and the molten glass of the second color in the channel.

6. A method comprising the steps of:
controlling a first valve device of a first color glass feeder with a controller to provide molten glass of a first color to a channel at a first flow rate;
controlling a second valve device of a second color glass feeder with the controller to provide molten glass of a second color to the channel at a second flow rate; and
incompletely miring the molten glass of the first color with the molten glass of the second color to form a mixture so that discrete portions of the first color and the second color are located in the mixture.

7. The method of claim 6 wherein
the controller is a computer.

8. The method of claim 6 wherein
the controller includes an interactive device into which a first flow rate value can be entered for controlling the first flow rate.

9. The method of claim 6 further comprising
controlling a robotic stirring device with the controller to control the movement of the robotic stirring device; and
wherein the robotic stirring device Is located so that the robotic stirring device can stir the mixture of the molten glass of the first color and the molten glass of the second color in the channel.

10. An apparatus comprising
a molten tin bath;
a mixing channel leading to the molten tin bath;

a first color glass feeder providing molten glass of a first color to the mixing channel;

a second color glass feeder providing molten glass of a second color to the mixing channel;

and a stirring device in the mixing channel which stirs a combination of the molten glass of the first color with the molten glass of a second color to provide a variegated glass mixture;

and wherein the molten tin bath receives the variegated glass mixture and provides a smooth glass sheet.

11. A method comprising providing molten glass of a first color to the mixing channel;

providing molten glass of a second color to the mixing channel;

stirring a combination of the molten glass of the first color with the molten glass of a second color to provide a variegated glass mixture;

supplying the variegated glass mixture to a tin bath to form a float glass sheet.

12. A method comprising using first and second forming rollers to make variegated glass tiles;

wherein each of the first and second forming rollers have an edge; and and wherein together the edges of the first and second forming rollers are used to separate molten variegated glass into at least two portions.

13. The method of claim 12 wherein the first edge of the first forming roller is a sharp protruding edge;

and the edge of the second forming roller is a sharp protruding edge.

* * * * *